(12) United States Patent
Pozzi et al.

(10) Patent No.: US 9,251,706 B2
(45) Date of Patent: Feb. 2, 2016

(54) PROXIMITY SENSOR

(75) Inventors: Silvio Pozzi, Merate (IT); Ivano Prandini, Nonantola (IT); Nicola Botta', Regoledo di Cosio (IT); Luca Pagni, Eiksmarka (NO)

(73) Assignee: CY.PAG. S.R.L., Morbegno (IT)

( * ) Notice: Subject to any disclaimer, the term of this patent is extended or adjusted under 35 U.S.C. 154(b) by 309 days.

(21) Appl. No.: 13/984,848

(22) PCT Filed: Feb. 24, 2012
(Under 37 CFR 1.47)

(86) PCT No.: PCT/IB2012/050864
§ 371 (c)(1),
(2), (4) Date: Mar. 12, 2014

(87) PCT Pub. No.: WO2012/114313
PCT Pub. Date: Aug. 30, 2012

(65) Prior Publication Data
US 2014/0225720 A1   Aug. 14, 2014

(30) Foreign Application Priority Data
Feb. 25, 2011 (IT) .............................. MI2011A0289

(51) Int. Cl.
*B60Q 1/00* (2006.01)
*G08G 1/16* (2006.01)
*G01S 15/58* (2006.01)
*G01S 15/60* (2006.01)
*G01S 15/93* (2006.01)

(52) U.S. Cl.
CPC ............... *G08G 1/16* (2013.01); *G01S 15/582* (2013.01); *G01S 15/60* (2013.01); *G01S 15/931* (2013.01)

(58) Field of Classification Search
CPC ......... G08G 1/16; G01S 15/582; G01S 15/60; G01S 15/931
USPC ............ 340/901–905, 435–436, 933; 342/29, 342/70
See application file for complete search history.

(56) References Cited

U.S. PATENT DOCUMENTS

| | | | |
|---|---|---|---|
| 4,308,537 A | 12/1981 | Berry et al. | |
| 5,767,793 A * | 6/1998 | Agravante | G01S 7/032 180/167 |
| 6,239,736 B1 | 5/2001 | McDonald et al. | |
| 2002/0180631 A1 | 12/2002 | Alon | |
| 2003/0160701 A1* | 8/2003 | Nakamura | G08B 13/181 340/686.6 |
| 2006/0056273 A1 | 3/2006 | Scoca et al. | |

FOREIGN PATENT DOCUMENTS

| | | |
|---|---|---|
| IT | MI2010A001885 A1 | 4/2012 |
| IT | MI2010A002161 A1 | 5/2012 |

* cited by examiner

*Primary Examiner* — Daryl Pope
(74) *Attorney, Agent, or Firm* — Pearne & Gordon LLP

(57) ABSTRACT

The invention discloses a proximity sensor (1) comprising at least one detecting unit (10) of at least one obstacle (40) and a control unit comprising receiving means (22) of first and second parameters (P1, P2) representative of the detecting unit and of features of the obstacle (40). The control unit (20) is further responsible for generation of detection signals (S, S1, Si, Sj) of the obstacle (40), as a function of the first and second representative parameters (P1, P2) and of third representative parameters (P3) of the detected obstacle (40).

10 Claims, 3 Drawing Sheets

PROXIMITY SENSOR

APPLICATION FIELD

The present invention relates to a proximity sensor.

In particular, the invention concerns an ultrasonic proximity sensor.

Ultrasonic sensors can in particular apply to the automotive sector; they are for example used in motor vehicles of any nature and in operative self-propelled equipment, and the following specification refers to this application field for the only purpose of simplifying exposition thereof.

PRIOR ART

In sensors of the known art, a signal emitted for detection of an obstacle is set for searching for the obstacle to a predetermined distance; the emitted-signal power is therefore pre-established and fixed.

The signal is always emitted by the sensor at a power necessary to detect an obstacle to a considerable distance; in other words, power is always dimensioned to a higher value than the value on average necessary, in order to prevent the signal from not reaching the obstacle.

The sensor is set in such a manner that it waits for return of the signal reflected by the obstacle and, based on the time required for the to and from travel, determines the distance of said obstacle.

The main disadvantage of the described sensors is that they cannot be configured; in other words, the technical power features, detection features and so on are fixed because they refer to a specific use.

Other drawbacks are the restricted applicability to a specific apparatus, bringing about limited detection of an obstacle to a predetermined distance.

All the above makes sensors of the known art unsuitable for use on machines different from each other; obviously, the necessity to produce a great number of sensors for each different use also involves higher production costs.

It is an aim of the present invention to provide a sensor that can be such configured that it is adaptable to different applications.

It is a specific aim of the invention to provide a sensor that can be configured based on the possible obstacle to be detected.

Another aim of the invention is to provide a sensor that adapts itself to variations of its state.

It is an additional aim to provide an improved sensor in terms of efficiency and reliability.

SUMMARY OF THE INVENTION

The foregoing and further aims are achieved by a proximity sensor according to that which is claimed in the appended claims.

The proximity sensor according to the invention achieves the following main technical effects relative to the known art:
selection of features for the obstacle being the target of the detection;
detection of an obstacle at intermediate varying distances relative to a predetermined distance;
variation of the detection region;
adaptation of the detection power to the detected distance from the obstacle;
greater detecting speed/detection efficiency
greater sensor reliability.

These and further technical effects of the invention will be better detailed in the description taken hereinafter of embodiments given by way of non-limiting example with reference to the accompanying drawings.

DETAILED DESCRIPTION

The proximity sensor of the invention comprises a detecting unit of at least one obstacle and a control unit comprising receiving means of configuration parameters representative of the detecting unit and of features of the obstacle.

The control unit is further responsible for generation of detection signals of the obstacle, as a function of the configuration parameters and parameters representative of the detected obstacle.

Figure 1:
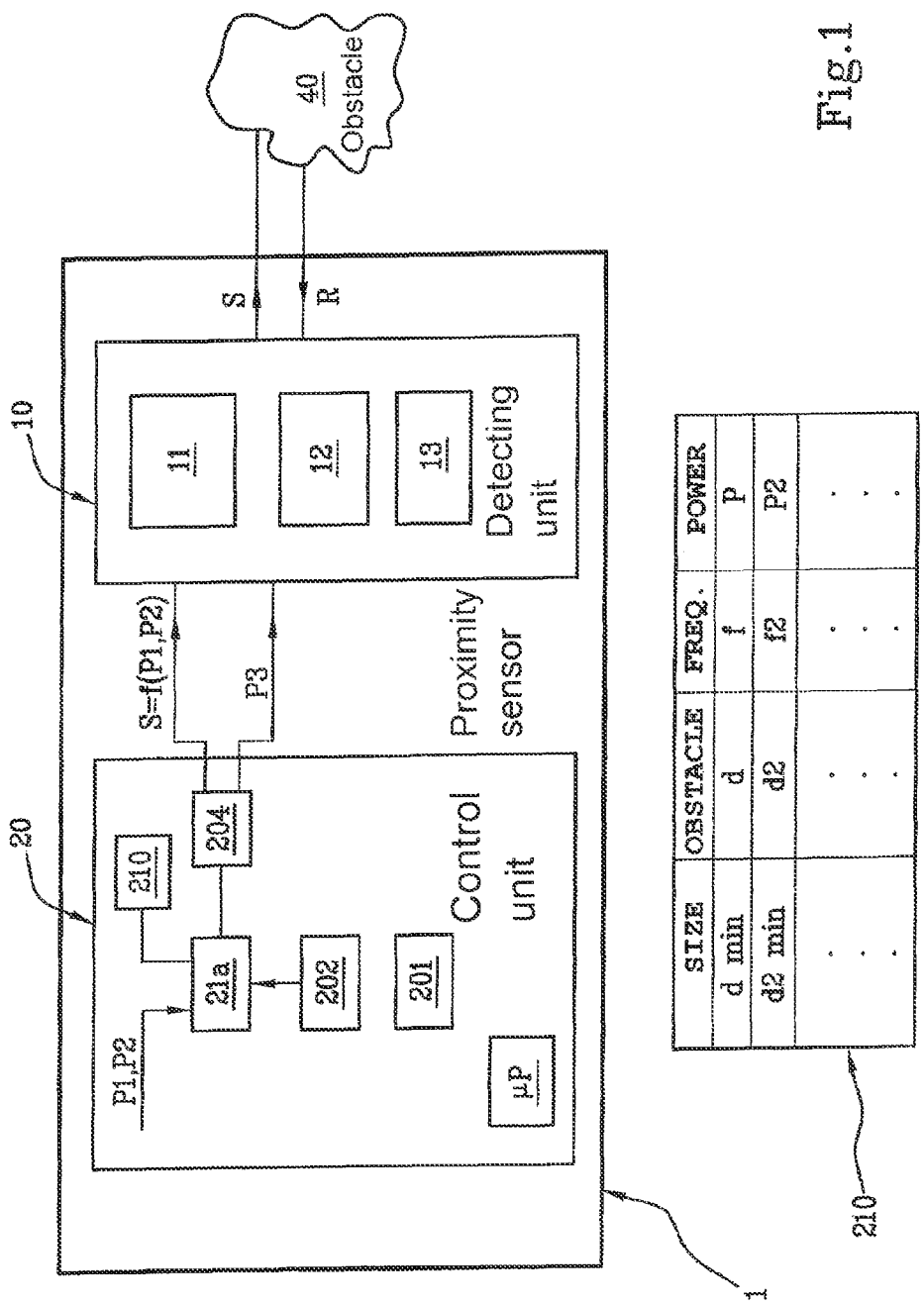
FIG. 1 shows a block diagram of the sensor of the invention.

In particular, with reference to FIG. 1, a proximity sensor 1 is configured to detect at least one obstacle 40.

In the present description, by the term "obstacle" it is intended any body, be it an object, individual or other, that can be detected by sensor 1 of the invention.

Sensor 1 of the invention is in particular configured, although not in a limiting sense, for being mounted on vehicles, still more particularly on industrial vehicles and operative self-propelled equipment such as described in patent application Nos. MI2010A001885 and MI2010A002161 in the name of the same Applicant.

Sensor 1 comprises at least one detecting unit 10 of at least one obstacle 40.

Figure 2:
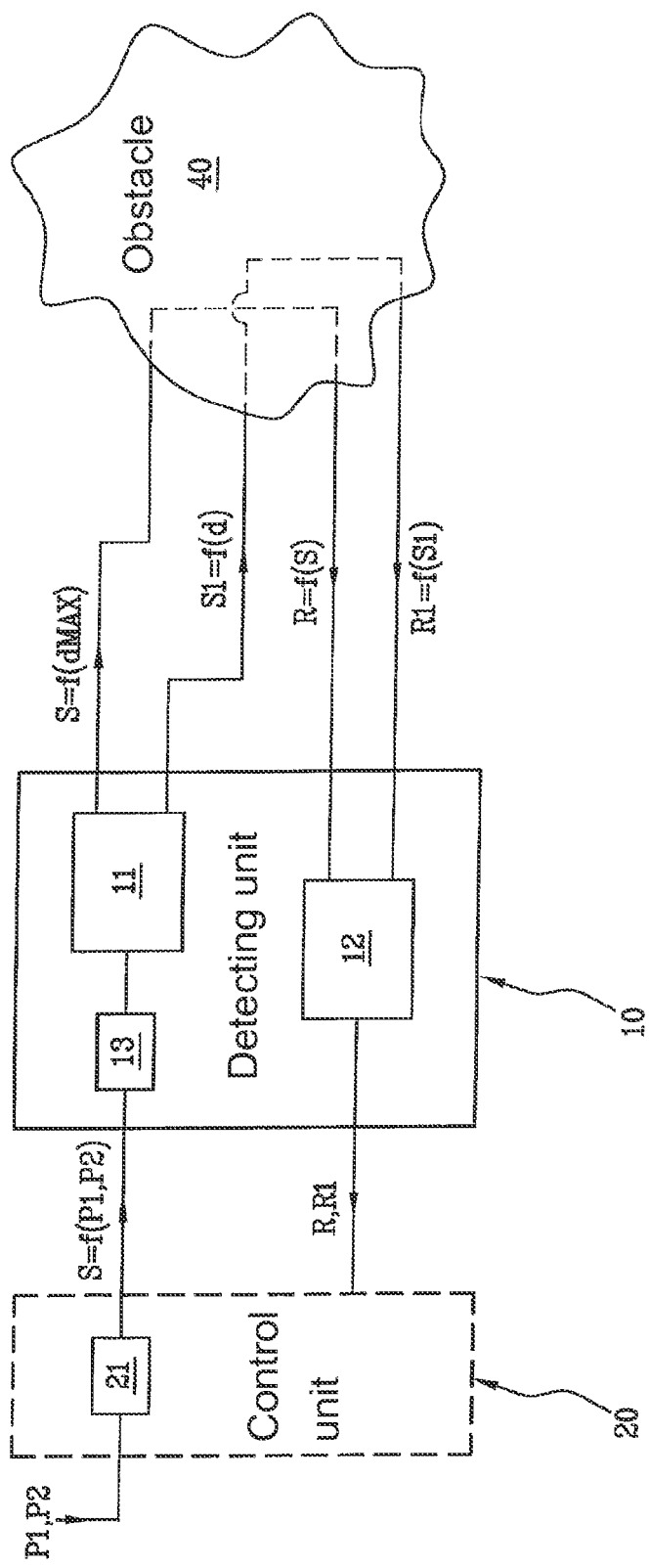
FIGS. 2 and 3 show portions of the block diagram seen in FIG. 1 in greater detail.

With reference to FIG. 2, each detecting unit 10, according to the invention, comprises a transmission module 11 configured to transmit a signal to an obstacle to enable detection thereof.

In particular, the transmission module 11 is configured to transmit at least one main transmission signal S to the at least one obstacle 40.

The detecting unit 10 further comprises a receiving module 12 configured to receive at least one reflected signal from obstacle 40.

In particular, the receiving module 12 is configured to receive at least one reflected main signal R from obstacle 40.

The reflected main signal R is representative of an occurred detection of obstacle 40.

Each detecting unit 10 comprises a transducer 13 (FIG. 2) connected to the transmission module 11.

The transducer is configured to convert the transmission signal into an ultrasonic signal designed to hit the obstacle in order to enable identification thereof.

In particular, transducer 13 is configured to convert the at least one main transmission signal S into an ultrasonic signal designed to hit obstacle 40 to enable identification thereof.

In a preferred embodiment, frequency of the ultrasonic signal used is included in the range of 35 to 45 Khz, in particular of 38 to 42 Khz.

According to the invention, the proximity sensor 1 comprises a control unit 20.

Generally, it should be noted that in the present context and the following claims, the control unit 20 and generally the other units, the detecting unit 10 for example, will possibly appear as divided into distinct functional modules (memory modules or operative modules) for the only purpose of describing the operative character of the units themselves in a clear and full manner.

The control units can consist of a single electronic device, suitably programmed for performing the described operative functions and the different modules can correspond to hardware and/or routine software components being part of the programmed device.

Alternatively or in addition, these operative functions can be performed by a plurality of electronic devices on which the aforesaid functional modules can be distributed.

The control units can in addition take advantage of one or more processors for carrying out the instructions contained in the memory modules.

Said functional modules can in addition be distributed on different computers, locally or remotely, based on the architecture of the network in which they reside. The control unit 20 is configured to generate at least the main transmission signal S.

According to the invention, the control unit 20 comprises a memory 21a adapted to receive first parameters P1 representative of features of an obstacle 40 to be detected.

More generally, the control unit 20 comprises receiving means 21 for receiving the first parameters P1 representative of features of an obstacle 40 to be detected.

The technical effect thus reached is adaptability of the sensor of the invention to different applications marked by different operation conditions of the sensor itself, and/or different environmental conditions.

A service man or a dedicated program inputs to sensor 1 the parameters indicating some of the specific features of the obstacle to be detected.

A user interface can be employed for inputting the first parameters P1 to memory 21a.

In addition, or alternatively, a hardware programming device can allow the same operative functions.

In a preferred embodiment, the first parameters P1 comprise a first distance parameter P11 representative of a maximum distance value dmax between the obstacle 40 to be detected and sensor 1.

In other words, through the first distance parameter P11 it is possible to set the space limit within which the sensor must try to detect an obstacle.

This limit depends on the environment in which the vehicle or operative means acts.

In a shed of big sizes in which the means present moves at reduced speed (1-3 km/h, for example), this space limit will be in the order of a few meters and the sensor that is mounted on one means, will look after detecting other means moving close thereto, or fixed obstacles such as walls, benches, etc.

In an environment of more reduced sizes or in which moving means at much higher speeds (10-20 km/h) is present, the space limit will be more reduced so as to readily detect a moving-close obstacle before a collision occurs.

In a preferred embodiment, the first parameters P1 furthermore comprise a dimension parameter P12, representative of a minimum size drain of the obstacle 40 that is wished to be detected by sensor 1.

In other words, the dimension parameter P12 enables setting of a minimum size of the obstacle that is wished to be detected.

For instance, if the sensor of the invention is mounted on self-propelled operative equipment, such as a crane, the minimum size for detection of an obstacle is set in such a manner as to neglect objects that do not inhibit displacement and work of the crane itself, such as ruins of reduced sizes (in the order of the $dm^3$), stones, etc.

If, on the contrary, the sensor is mounted on a home lawnmower, the dimension parameter P12 will be set with a smaller absolute value relative to the preceding case, in the order of the $cm^3$ for example. In this case, in fact, even a stone may impair operation of the lawnmower.

The control unit 20 comprises a first calculation module 201 operation of which will be described in the following.

The control unit 20 further comprises a second calculation module 206 (FIG. 3) configured to calculate a frequency f of the main transmission signal S, starting from the minimum dimension value dmin.

The second calculation module 206 calculates the wavelength value λ as a function of the minimum dimension value dmin.

The calculation module 206 calculates the frequency value f of the main transmission signal with the following formula:

$f=\lambda/c$, where c is the known propagation speed of the signal in air.

According to the invention, memory 21a of sensor 1 is moreover adapted to receive second parameters P2 representative of features of the detecting unit 10.

In other words, a service man or a dedicated program inputs to memory 21a parameters specifying some configuration ranges typical of it to sensor 1, to be used for detection of an obstacle 40.

Input can be carried out using the same modalities as the input of first representative parameters P1.

In a preferred embodiment, the second parameters P2 comprise a speed parameter P21 representative of a movement speed v of the proximity sensor 1.

In other words, when the proximity sensor 1 of the invention is mounted on a moving machine having speed v, the speed parameter P21 contains the value of this speed that is constantly updated.

More limiting configuration parameters of the detecting unit will correspond to a higher speed of the machine. The control unit 20 comprises a compensation module 207 (FIG. 3), associated with the first calculation module 201.

The compensation module 207 is configured to receive as an input a current speed value v of the sensor and compensate for calculation of the distances of obstacle 40 from sensor 1, as a function of the speed v of the sensor itself.

This calculation will be shown in greater detail in the following of the present description.

According to the invention, therefore, the control unit is configured to generate at least the main transmission signal S, as a function of the first and second parameters P1, P2.

In other words, with reference to FIG. 1:

$$S=f(P1,P2).$$

To this aim, the control unit 20 comprises a first signal generation module 203.

According to the invention, the transmitting module 11 is configured to transmit at least one main transmission signal S to a predetermined maximum distance dmax, as a function of one or more of the first parameters P1 and the second parameters P2.

In other words, the transmitting module 11 is configured to vary the intensity of the main transmission signal S in such a manner that this intensity is proportional to the predetermined maximum distance dmax, as a function of one or more of the first parameters P1 and the second parameters P2.

In other words, these parameters P1, P2 enable the features of the main signal S to be transmitted to obstacle 40 to be set.

Following transmission of the main signal, the receiving module 12 is configured to receive a main reflected signal R.

In other words, the main reflected signal R is a function of the transmitted main transmission signal S. In still other words, R=f(S) (FIG. 2).

The receiving module 12 is configured to transmit at least the upstream main reflected signal R to the control unit 20.

In other words, the system comprising the control unit 20, transmitting module 11 and receiving module 12 is a feedbacked system in which the control unit 20 is the transfer function, the transmission signal S is the "cause" and the reflected signal R is "the effect". Advantageously, according to the invention, these features will be progressively refined so as to reach detection of the obstacle by a signal calibrated for the obstacle itself.

The sensor carries out this progressive refining by exploiting third configuration parameters P3 representative of features of the detected obstacle 40. According to the invention, memory 21a of sensor 1 is in fact adapted to receive third parameters P3 representative of features of the detected obstacle 40. According to the invention, the third parameters P3 are representative of features of obstacle 40 obtainable from a signal reflected by obstacle 40 itself.

In particular, the main reflected signal R is representative of the occurred proximity detection of obstacle 40 and the third parameters P3 are representative of features of obstacle 40 obtainable at least from the main reflected signal R.

In a preferred embodiment, the third parameters P3 comprise a second distance parameters P31 representative of a calculated distance d of sensor 1 from obstacle 40.

According to the invention, the control unit 20 comprises a first calculation module 201 that is configured to calculate the third parameters P3, representative of features of the detected obstacle 40, obtainable from at least one reflected signal.

According to the invention, the control unit 20 comprises a second generation module 204 configured to generate at least one additional transmission signal as a function of parameters P3.

Preferably, the transmission signal is generated for at least one detecting unit 10.

In a preferred embodiment of the invention, the first calculation module 201 calculates the third parameters P3 starting from the main reflected signal R, and the generation module 204 generates at least one additional transmission signal S1 as a function of the calculated parameters P3.

According to the invention, as already mentioned, the control unit 20 also calculates the distance parameter P31, in particular a calculated distance d of sensor 1 from obstacle 40.

For the above purpose and still others, according to the invention, the first calculation module 201 is configured to receive as an input the reflected signal R and calculate a distance d of sensor 1 from obstacle 40.

As it is well known to a person skilled in the art, the distance value d is calculated as half-product of the speed value of signal S in the environment, for the time elapsed between transmission of signal S by the transmitting unit 10 and reception of signal R by the receiving module 12.

In other words, after transmission of the main signal S to the obstacle and return of the main reflected signal R from the obstacle, it is possible to understand whether the obstacle is at the assumed distance dmax for transmission of the main signal S.

The control unit 20 comprises a comparison module 202, connected to the first calculation module 201 and adapted to compare successive calculated distance values from obstacle 40.

According to the invention, the comparison module 202 is adapted to compare the calculated distance d and maximum distance dmax values.

The comparison module 202 receives as an input the d and dmax distance values and generates as an output a signal representative of the comparison.

If the calculated distance d is coincident with the maximum distance dmax, the comparison module 202 generates a selection signal Se to be discussed in the following.

Figure 3:
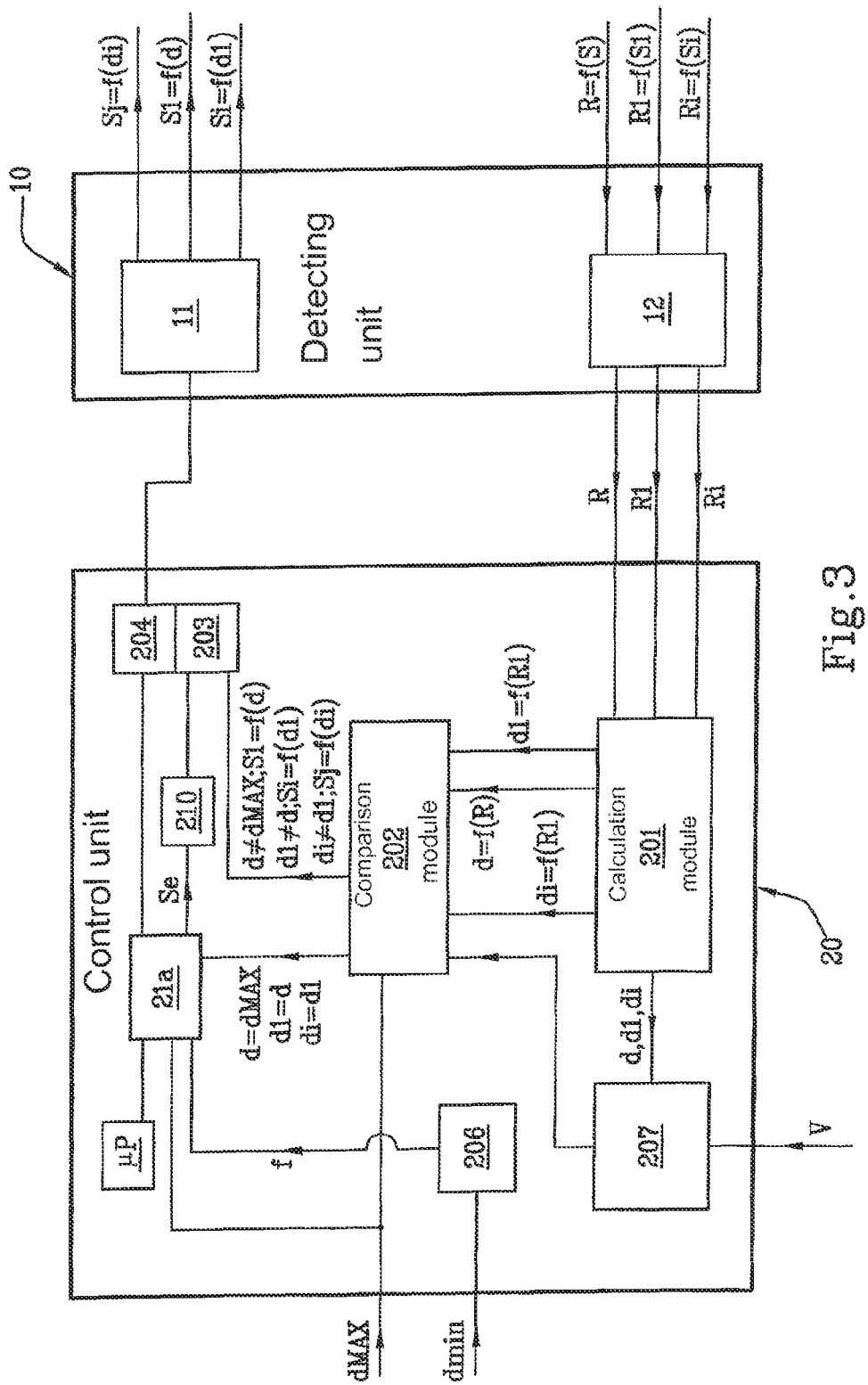

If the calculated distance d is not coincident with the maximum distance dmax, the comparison module 202 generates a signal S1=f(d) inputted to the second generation module 204, as shown in FIG. 3.

In other words, if the calculated distance d is different from dmax, then the transmission module 11 will transmit an additional signal S1.

In particular, d will be smaller than or as high as the maximum distance dmax.

The technical effect achieved is verification of the presence of an obstacle to a distance different from the maximum distance assumed at the start.

According to the invention, the transmission module 11 is configured for transmission of at least one additional transmission signal S1 to the calculated distance d.

The technical effect achieved is verification of the presence of an obstacle 40 to the distance d and not to the distance dmax assumed at the start.

In other words, the transmission module 11 is configured to vary the intensity of the additional transmission signal S1 in such a manner that this intensity is proportionate to the calculated distance d.

The receiving module 12 is configured for receiving at least one additional reflected signal 1 as a function of the transmitted additional transmission signal S1.

In other words, R1=f(S1) (FIGS. 2 and 3).

The first calculation module 201 is configured to calculate a distance d1 of obstacle 40 from sensor 1 as a function of the reflected signal R1.

In other words, d1=f(R1).

The comparison module 202 is configured to compare the respective calculated distances d, d1 of sensor 1 from obstacle 40 obtainable from the main R and additional R1 reflected signals, respectively.

The comparison module 202 receives as an input the calculated distance values d and d1 and generates as an output a signal representative of the comparison.

If the calculated distance d1 is coincident with distance d, the comparison module 201 generates a selection signal Se to be discussed in the following.

If the calculated distance d1 is not coincident with distance d, the comparison module 202 generates a signal Si=f(d1) as an input to the second generation module, as shown in FIG. 3.

In other words, if the calculated distance d1 is different from d, then the transmission module 11 will transmit an additional signal S1.

In other words, if d1 is not coincident with d, this means that obstacle 40 has moved and that new detection is necessary to enable accurate localisation thereof. Consequently, a new transmission signal Si will be sent to obstacle 40 from the transmitting module 11 and a new reflected signal R1 will be received by the receiving module 12.

In other words, Ri=f(Si) (FIGS. 2 and 3).

The first calculation module 201 will calculate a new distance di as a function of the reflected signal Ri, i.e. di=f(Ri).

The comparison module 202 will calculate either a new transmission signal Sj inputted to the second generation module 204, if di is different from d1, or a signal Se, if di is coincident with d1.

In an alternative form of the invention, calculation of the distance values d, d1, di is also influenced by the current speed v of the sensor.

To this aim, the control unit 20 comprises the compensation module 207, associated with the first calculation module 201.

The compensation module 207 is configured to receive as an input:
- a current speed value v of the sensor from the receiving means 21;
- successive distance values d, d1, di, calculated by the first calculation module 201.

The compensation module 207 is further configured:
- to calculate the space covered by the sensor as a function of the movement speed v;
- to subtract the calculated covered space from the distance calculated at two successive detection instants of obstacle 40.

The compensation module 207 is configured to transmit the obtained result again to the comparison module 202. In this manner, calculation of the speed variation is carried out in the mathematical conditions of zero relative movement of the sensor relative to the obstacle.

In other words, although the sensor is in motion relative to obstacle 40, the obstacle state (movement or immobility) is in any case detected.

The detecting operations, i.e. signal transmissions to the obstacle, will terminate when a consecutive pair of coincident distance values is obtained, in which the distance values can also have been influenced by the sensor movement, as above said.

As already mentioned, in the following cases:
- d=dmax;
- d1=d;
- di=d1;

the comparison module 202 is configured to generate a selection signal Se.

According to the invention, this signal Se is transmitted to the memory unit 21a and the second generation module 204 for the corresponding generation of a transmission signal.

According to the invention, the control unit 20 comprises an additional memory module 210, associated with memory 21a, and comprising data representative of the transmission signals S, S1, Si and the calculated distances d, d1, di of the sensor from obstacle 40.

The additional memory module 210 further comprises predetermined power values P as a function of distances of sensor 1 from obstacle 40.

Furthermore, the additional memory module 210 comprises values of one or more parameters P1, P2 previously inputted to memory 21a.

Memory 21a, according to the invention, receives the selection signal Se and transmits it to the additional memory module 210.

The selection signal Se is configured to select, in the additional memory module 210, a power value P for a transmission signal S, S1, Si or Sj as a function of the true distance d, d1, di, calculated from obstacle 40, and of one or more parameters P1, P2.

The control unit 20 is therefore configured to transmit the selected power value P to the transmission unit 11, in such a manner that a power-optimised transmission signal is generated by the second generation module 204 for optimised detection of obstacle 40.

The technical effect achieved is determination of a transmission signal towards the obstacle at an optimal power for the true distance of the sensor from the obstacle.

This involves optimisation of the emitted energy for the transmitted signals and less response time. In fact, the waiting time for the signal reflected by the receiving module 12 is proportional to the power P of the signal transmitted from the transmitting module 11 to obstacle 40.

If the transmitted signal is power-optimised, the waiting time of the receiving module is optimised.

In real terms, the detection time for an obstacle is minimised, while the detection efficiency is maximised. In addition, taking into account the above, the sensor can be supplied with the minimum necessary power.

This is particularly important when the sensor is housed in a battery-powered machine and therefore power is not potentially unlimitedly available.

Some examples are an electric machine for golf course or an automated lawn mower robot, operation of which takes place far from the recharging base thereof.

As already pointed out, the invention discloses a proximity sensor 1 of an obstacle 1 for vehicles and operative self-propelled equipment, said sensor comprising:
- at least one detecting unit 10 of at least one obstacle 40, said detecting unit 10 comprising:
- a transmitting module 11 configured to transmit at least one transmission signal S, S1, Si, Sj to at least one obstacle 40;
- a receiving module 12 configured to receive at least one reflected signal R, R1, Ri, Rj from said at least one obstacle 40, wherein said at least one reflected signal R, R1, Ri, Rj is representative of the occurred proximity detection of said at least one obstacle 40;
- a control unit 20 comprising:
- receiving means 21 of:
- first parameters P1 representative of characteristics of said obstacle 40 to be detected;
- second parameters P2 (v sensor) representative of characteristics of said detecting unit 10;
- third parameters P3 representative of characteristics of said detected obstacle 40;
- a first generation module 203 configured to generate at least one main transmission signal S, as a function of said parameters P1, P2, said main signal S being generated for said at least one detecting unit 10;
- a first calculation module 201 configured to calculate said third parameters P3, representative of characteristics of the detected obstacle 40, obtainable from said at least one reflected signal R, R1, Ri;
- a second generation module 204 configured to generate at least one transmission signal S1, Si, Sj as a function of said parameters P3, said at least one signal S1, Si, Sj being generated for said at least one detecting unit 10.

In addition, the first calculation module 201 is configured:
- to receive said at least one reflected signal R, R1, Ri;
- to calculate a distance d, d1, di of said at least one obstacle 40 from said sensor 1 as a function of said at least one reflected signal R, R1, Ri.

In addition, the control unit 20 of the proximity sensor 1 of the invention comprises a comparison module 202, connected to said first calculation module 201 and configured to compare the respective calculated distances d, d1, di with each other, obtainable from the respective said reflected signals R, R1, Ri.

In addition, the comparison module 202 is configured to transmit a value of calculated distance d1, di to said transmitting module 11, as a function of said additional reflected signal R1, Ri, if said calculated distance d1, di differs from said calculated first distance d, d1.

In addition, the receiving means 21 comprises a memory 21a and said comparison module 202 is configured to generate a selection signal Se for said memory 21a if said calculated distance d1, di is coincident with said calculated distance d, d1.

The invention claimed is:

1. A proximity sensor (1) for detecting an obstacle or target (40) for vehicles and operative self-propelled equipment, said sensor (1) comprising:
   - I: at least one detecting unit (10) of at least one obstacle (40), said detecting unit (10) comprising:
     - a: a transmitting module (11) configured to transmit at least one transmission signal (S, S1, Si, Sj) to at least one obstacle (40);
     - b: a receiving module (12) configured to receive at least one reflected signal (R, R1, Ri, Rj) from said at least one obstacle (40), wherein said at least one reflected signal (R, R1, Ri, Rj) is representative of an occurred proximity detection of said at least one obstacle (40);
   - II: a control unit (20) comprising:
     - a: receiving means (21) of:
       - i: first parameters (P1) representative of characteristics of said obstacle (40) to be detected;
       - ii: second parameters (P2) representative of characteristics of said detecting unit (10);
       - iii: third parameters (P3) representative of characteristics of said detected obstacle (40);
     - b: a first generation module (203) configured to generate at least one main transmission signal (S), as a function of said parameters (P1, P2), said main signal (S) being generated for said at least one detecting unit (10);
     - c: a first calculation module (201) configured to calculate said third parameters (P3), representative of characteristics of the detected obstacle (40), obtainable from a reflected signal (R) reflected by said main transmission signal (S);
     - d: a second generation module (204) configured to generate at least one additional transmission signal (S1) as a function of said parameters (P1, P2, P3), said at least one additional signal (S1) being generated for said at least one detecting unit (10);
     - e: a comparison module (202), connected to said first calculation module (201), and configured to compare the respective calculated distances (d, d1, di) with each other, which distances are obtainable from said respective reflected signals (R, R1, Ri);
   wherein said comparison module (202) is configured to transmit a calculated-distance value (d1, di) to said transmitting module (11), as a function of said additional reflected signal (R1, Ri), if said calculated distance (d1, di) is different from said first calculated distance (d, d1);
   wherein the value of calculated distance (d, d1) as a function of said additional reflected signal (R1, Ri) is obtained from an additional transmission signal (S1, Si) transmitted after said main transmission signal (S);
   wherein said receiving means (21) comprises a memory (21a) and said comparison module (202) is configured to generate a selection signal (Se) for said memory (21a) if said calculated distance (d1, di) is coincident with said first calculated distance (d, d1).

2. A proximity sensor (1) as claimed in claim 1, wherein said first calculation module (201) is configured to:
   - a: receive said at least one reflected signal (R, R1, Ri);
   - b: calculate a distance (d, d1; di) of said at least one obstacle (40) from said sensor (1) as a function of said at least one reflected signal (R, R1, Ri);
   - c: said distance (d, d1) being obtained from said at least an additional transmission signal (S1, Si, Sj) transmitted after said main transmission signal (S).

3. A proximity sensor (1) as claimed in claim 1, wherein:
   - a: said transmitting module (11) is configured to transmit said at least one main transmission signal (S) in such a way that it is configured to reach a predetermined maximum distance (dmax) as a function of one or more of said first parameters (P1) and second parameters (P2);
   - b: said receiving module (12) is configured to receive said at least one main reflected signal (R) as a function of said at least one transmitted main transmission signal.

4. A proximity sensor (1) as claimed in claim 1, wherein:
   - a: said transmitting module (11) is configured to transmit said at least one additional transmission signal (S1, Si, Sj) in such a way that it is configured to reach said calculated distance (d, d1, di);
   - b: said receiving module (12) is configured to receive at least one additional reflected signal (R1, Ri) as a function of said at least one transmitted additional transmission signal (S1, Si, Sj).

5. A proximity sensor (1) as claimed in claim 1, wherein said control unit (20) comprises an additional memory module (210) associated with said memory (21a), said additional memory module comprising one or more of:
   - a: data representative of said transmission signals (S, S1, Si);
   - b: data representative of said calculated distances (d, d1, di) of said sensor (1) from said target (40);
   - c: values of one or more of said inputted parameters (P1, P2) comprised in said memory (21a);
   - d: predetermined power values (P) associated with value ranges of said representative data and said parameters (P1, P2).

6. A proximity sensor (1) as claimed in claim 5, wherein said selection signal (Se) is configured to select a predetermined power value (P) for a transmission signal (S, S1, Si, Sj) in said additional memory module (210) as a function of said calculated distance (d, d1, di) and/or of one or more of said parameters (P1, P2).

7. A proximity sensor (1) as claimed in claim 6, wherein said detecting unit (10) comprises a transducer (13) connected to said transmitting module (11), wherein said transducer (13) is configured to convert said at least one transmission signal (S, S1, Si, Sj) into an ultrasonic signal.

8. A proximity sensor (1) as claimed in claim 1, wherein said first parameters (P) comprise one or more of:
   - a: a first distance parameter (P11) representative of a maximum distance value (dmax) of said obstacle (40) from said sensor (1);
   - b: a dimension parameter (P12) representative of a minimum dimension value (dmin) of said obstacle.

9. A proximity sensor (1) as claimed in claim 1, wherein said second parameters (P2) comprise a speed parameter (P21) representative of a movement speed (v) of the proximity sensor (1).

10. A proximity sensor (1) as claimed in claim 1, wherein said third parameters (P3) comprise a second distance parameter (P31) representative of a calculated distance (d, d1, di) of the sensor (1) from the obstacle (40).

* * * * *